United States Patent
Ahmed et al.

(10) Patent No.: US 11,545,900 B2
(45) Date of Patent: Jan. 3, 2023

(54) EFFICIENT WIDE VOLTAGE RANGE QUASI-PARALLEL VOLTAGE REGULATOR

(71) Applicant: VIRGINIA TECH INTELLECTUAL PROPERTIES, INC., Blacksburg, VA (US)

(72) Inventors: Mohamed Ahmed, Blacksburg, VA (US); Fred C. Lee, Blacksburg, VA (US); Qiang Li, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 16/865,236

(22) Filed: May 1, 2020

(65) Prior Publication Data

US 2020/0350827 A1    Nov. 5, 2020

Related U.S. Application Data

(60) Provisional application No. 62/842,082, filed on May 2, 2019.

(51) Int. Cl.
    *H02M 3/335*     (2006.01)
    *H02M 3/158*     (2006.01)
    *H02M 3/00*     (2006.01)

(52) U.S. Cl.
CPC ............ *H02M 3/158* (2013.01); *H02M 3/01* (2021.05); *H02M 3/1584* (2013.01);
(Continued)

(58) Field of Classification Search
None
See application file for complete search history.

(56) References Cited

U.S. PATENT DOCUMENTS 7,872,886 B2    1/2011    Xu et al.
9,431,825 B2 *    8/2016    Arditi ................. H02J 13/0003
(Continued)

OTHER PUBLICATIONS

M. Ahmed, C. Fei, F. C. Lee, and Q. Li, "High-Efficiency High-Power-Density 48/1V Sigma Converter Voltage Regulator Module," in Conference Proceedings—IEEE Applied Power Electronics Conference and Exposition—APEC, 2017.
(Continued)

*Primary Examiner* — Jeffrey A Gblende
(74) *Attorney, Agent, or Firm* — Thomas | Horstemeyer, LLP

(57) ABSTRACT

Aspects of an efficient, wide voltage range, power converter system are described. In one example, a power converter system includes a first power converter, a second power converter, and a controller for the power converter. An input of the first power converter and an input of the second power converter are connected in series across an input voltage for the power converter system, and an output of the first power converter and an output of the second power converter are connected in parallel at an output of the power converter system. The controller is configured to regulate the second power converter and to determine whether or not to regulate the first power converter based on the input voltage for the power converter system and an output voltage of the power converter system, among other factors, for greater efficiency of the power converter system over wider input and output voltage ranges.

20 Claims, 7 Drawing Sheets

(52) U.S. Cl.
CPC ... *H02M 3/33573* (2021.05); *H02M 3/33576* (2013.01); *H02M 3/33571* (2021.05)

(56) References Cited

U.S. PATENT DOCUMENTS

| | | | |
|---|---|---|---|
| 9,614,453 B2* | 4/2017 | Dai | H02M 3/337 |
| 2005/0254272 A1* | 11/2005 | Vinciarelli | H02M 3/33569 |
| | | | 363/65 |
| 2005/0270812 A1* | 12/2005 | Vinciarelli | H02M 3/157 |
| | | | 363/65 |
| 2010/0321962 A1* | 12/2010 | Lee | H02M 3/33523 |
| | | | 363/21.12 |
| 2011/0080102 A1* | 4/2011 | Ge | H05B 45/46 |
| | | | 315/200 R |
| 2011/0080146 A1* | 4/2011 | Li | H02M 3/285 |
| | | | 323/237 |
| 2018/0175741 A1* | 6/2018 | Andersen | H02M 3/1584 |
| 2019/0157978 A1* | 5/2019 | Ni | H02M 3/285 |

OTHER PUBLICATIONS

M. Ahmed, C. Fei, F. C. Lee, and Q. Li, "Wide Voltage Range High-Efficiency Sigma Converter 48V VRM With Integrated Magnetics" 2017.

* cited by examiner

EFFICIENT WIDE VOLTAGE RANGE QUASI-PARALLEL VOLTAGE REGULATOR

CROSS-REFERENCE TO RELATED APPLICATIONS

This application claims the benefit of U.S. Provisional Patent Application No. 62/842,082, titled "Efficient Wide Voltage Range Quasi-Parallel Voltage Regulator," filed on May 2, 2019, the entire contents of which is fully incorporated herein by reference.

BACKGROUND

Many commercially available electronic devices require power at a well-regulated, substantially constant, or well-defined voltage for proper operation. Among such devices, microprocessors and other high-speed logic circuits generally rely upon well-defined, stable voltages for proper operation.

Trends in microprocessor designs have featured increased levels of integration of circuitry on a single chip and the use of higher clock speeds. These design trends have also led to more stringent and complex voltage regulation requirements, possibly with specified voltage droop requirements with increasing current, to reduce power dissipation requirements at high currents. Particularly, for programmed microprocessors, voltage regulation requirements with very high current slew rates are needed. High efficiency is also demanded since many microprocessor applications derive power from batteries which can limit the time of operation before the batteries become excessively discharged. Small size and weight and low cost are also very desirable, particularly for use with microprocessors.

Many of these requirements impose conflicting constraints and trade-offs which may be difficult to accommodate. For example, accommodation of high current slew rate can be achieved with large output filter capacitances, but such output filters compromise accurate voltage control and increase size, weight, and cost. Similarly, the requirement for lower power supply output voltages generally compromises efficiency since a lower output voltage generally increases the voltage step-down achieved by a DC/DC converter. At the same time, sophisticated power converter designs are required to achieve even small increases in efficiency. On the other hand, some voltage converter designs are known to provide characteristically high efficiency, but these designs cannot achieve other desired characteristics while maintaining such efficiency or present other intractable design problems.

A voltage regulator module (VRM) is a power converter that provides one or more working voltages to microprocessors, such as central processing units (CPUs) and graphics processing units (GPUs), among other processing circuitry in computing systems. As one example, a VRM may convert a voltage potential of +5 V, +12 V, +24 V, or +48V to one or more lower voltages for microprocessors. VRMs can be used to permit a number of different microprocessors to be mounted onto the same board, increasing the level of integration. VRMs can be integrated with and mounted onto or separated from motherboards.

Some microprocessors incorporate voltage regulation components. A voltage regulator integrated in the same package or die as a microprocessor is typically referred to as an integrated voltage regulator (IVR). Many modern CPUs and GPUs are designed for power supply potentials of less than 1.5 V. The use of lower voltages helps to reduce power dissipation and the requirements for complicated and expensive cooling systems. Some VRMs provide a fixed power supply to microprocessors, but many VRMs are capable of monitoring for a varying level of demand for power over time and adjusting for the demand. Thus, a VRM can act as a continuously-variable adjustable regulator.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

With the ever-increasing demands of cloud computing and big data processing, a significant share of the total power consumption will be attributed to data centers and telecommunication applications by the year 2020. The use of multi-core processors with high power demands results in higher power consumption per server rack, reaching above the 15 kilowatt (KW) range, for example. In this context, it is clear that new, more efficient power conversion architectures are needed, particularly for data centers and the server racks in data centers. By replacing 12 volt (V) bus distribution with a 48 V bus distribution, rack level distribution loss can be reduced significantly to increase the overall system efficiency. However, the use of 48V bus distribution architectures leads to challenges in high-power-density designs. It can be challenging to provide high-power-density designs while also providing tightly regulated output voltages that meet the stringent transient requirements by loads at high current slew rates (e.g., >1000 A/uSec) with small overshoot and undershoot requirements (e.g., <50 mV).

As discussed above, voltage regulation modules (VRMs) are commonly used to provide microprocessors and other computer processing circuits with appropriate supply voltages. VRMs typically convert relatively higher voltage potentials to lower voltage potentials required by the microprocessors and other computer processing circuits. Two-stage VRM configurations are also used for this purpose in some cases. There are various configurations of two-stage VRM modules. In one example, a factorized power architecture consists of a soft-switched first-stage buck-boost regulator module, cascaded with a soft-switched unregulated voltage transformation module. This architecture provides one solution to achieve relatively high efficiency and high density, although a wide range of other architectures are possible.

Another two-stage VRM configuration includes an unregulated DC/DC transformer (DCX) as the first stage and a multi-phase buck converter for the second stage. This solution has also reported a relatively high efficiency and high density. Replacing the DCX first stage with a resonant switched capacitor circuit, as another example, has also been reported. That configuration can achieve relatively high efficiency and high density for the first stage converter. Two-stage configurations are generally scalable and simple, with a possibility of optimizing the intermediate bus voltage to increase overall performance efficiency. However, the efficiency of two-stage configurations can be limited in certain aspects, and two-stage configurations incorporate a number of efficiency trade-offs.

Figure 1:
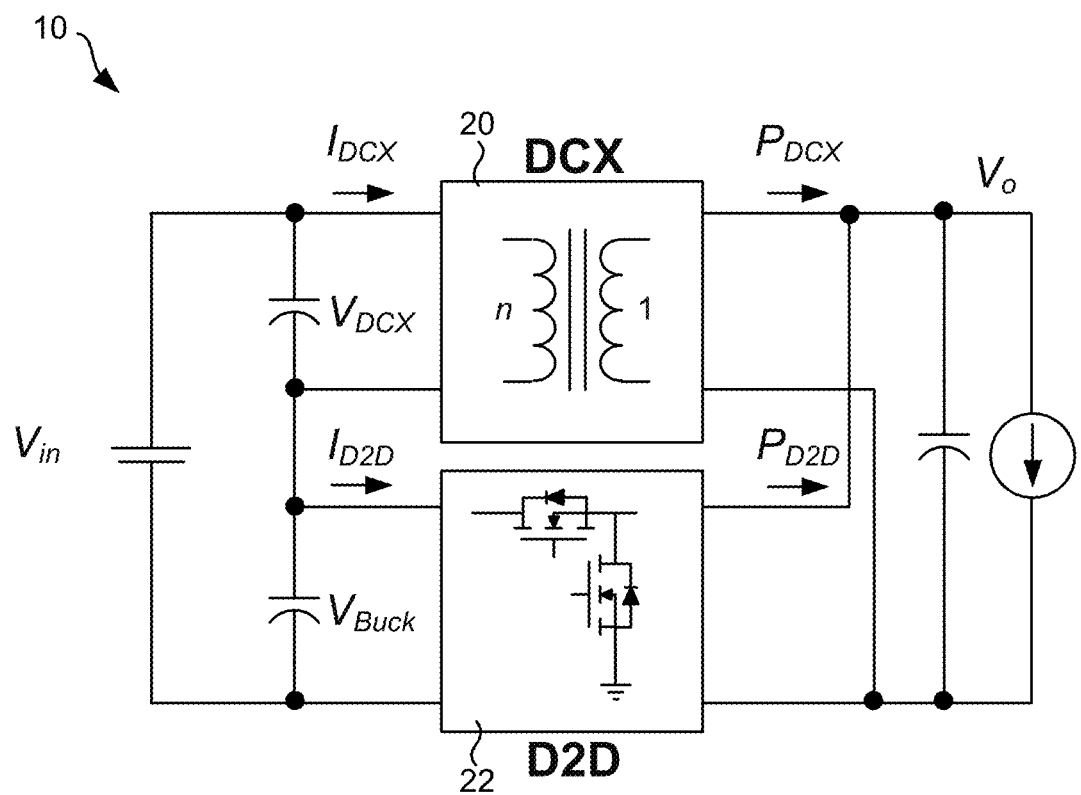
FIG. 1 illustrates a quasi-parallel power converter according to various examples described herein.

The quasi-parallel converter is another two-stage VRM configuration. The quasi-parallel converter concept was proposed in U.S. Pat. No. 7,872,886, the entire contents of which is hereby incorporated herein by reference. FIG. 1 illustrates a quasi-parallel power converter 10 according to various examples described herein. The quasi-parallel power converter 10 exhibits outstanding performance over multi-phase buck converters. The quasi-parallel power converter 10 connects two converters in series from the $V_{in}$ input side and in parallel from the $V_o$ output side. Among other components, the quasi-parallel power converter 10 includes an input power supply $V_{in}$, an output $V_o$ coupled, an unregulated DC/DC converter 20 (DCX) coupled across a first supply potential $V_{DCX}$, and a non-isolated regulated converter 22 (D2D) coupled across a second supply potential $V_{Buck}$.

The DCX converter 20 is an unregulated DC/DC converter that efficiently conducts bulk power from $V_{DCX}$ to the output $V_o$ and the load. The D2D converter 22 is a non-isolated, regulated converter responsible for regulating the output voltage $V_o$. The quasi-parallel power converter 10 can be designed for use with a wide range of input voltages $V_{in}$, such as 5 V, 12 V, 24 V, and 48 V, among others. The quasi-parallel power converter 10 can also be designed to provide a wide range of output voltages $V_o$, such as voltages in the ranges of 0.8 V-1.5 V and 2.5 V-3.5 V, among other suitable and desirable ranges for microprocessors and other computing circuitry.

One benefit of the quasi-parallel power converter 10 is the ability to achieve higher conversion efficiency by sharing or distributing the input power between the DCX converter 20 and the D2D converter 22. However, one drawback of early designs of the quasi-parallel power converter 10 is that this high conversion efficiency could only be realized over a relatively narrow range of input and output voltages. Efficient operation over a relatively narrow range of input and output voltages does not meet the CPU and GPU voltage requirements in many cases.

The embodiments described herein improve on the prior designs of power converters, including quasi-parallel power converters, using new control techniques. The control concepts described herein can be relied upon to efficiently regulate a power converter over a wider range of input and output voltages, to increase the total share of power delivered to the load and tightly regulate the output voltage. The control concepts result in a power converter that is semi-regulated in some modes of operation, to regulate its input voltage during specific operating conditions, and to increase operating efficiency of a larger power converter system by means of changing the voltage conversion gain of the power converter.

In one example, a new configuration of quasi-parallel power converter is described. The power converter includes a lower efficiency power converter responsible for regulating the output voltage while delivering a smaller portion of the power to the load and a higher efficiency semi-regulated power converter responsible of regulating its input voltage to maintain a certain power sharing ratio between the two converters. The control techniques result in increased overall operating efficiency.

Figure 2:
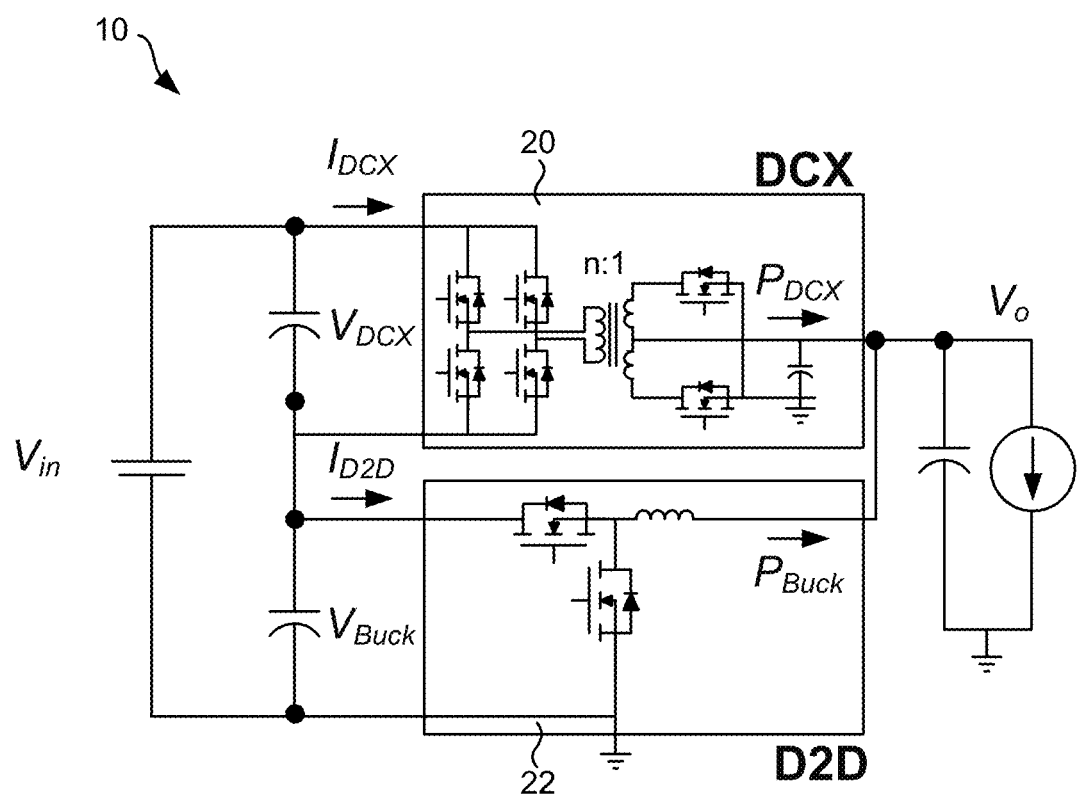
FIG. 2 illustrates example operating parameters of the quasi-parallel power converter shown in FIG. 1 according to various examples described herein.

FIG. 2 illustrates example operating parameters of the quasi-parallel power converter 10 shown in FIG. 1 according to various examples described herein. In one operating model for the quasi-parallel power converter 10, the input current of both converters 20 and 22 is given in Equation (1) below, by which the power through each converter is determined by the input voltage applied to each converter as given by Equation (2). The input voltage $V_{Buck}$ to the D2D converter 22 is a reflection of (determined in part by) the output voltage $V_o$ of the quasi-parallel power converter 10, the output voltage $V_{LLC}$ of the DCX converter 20, the turns ratio (n:1) of the transformer in the DCX converter 20, and the gain $G_{LLC}$ of the DCX converter 20, as given by Equation (3). Thus, the turns ratio (n:1) of the transformer in the DCX converter 20 and the gain $G_{LLC}$ of the DCX converter 20 play an important role in maximizing the operating efficiency of the power converter 10. The quasi-parallel power converter 10 can be designed to allow the bulk of the output power to flow through the DCX converter 20, which is the more efficient path. The remaining power will flow through the D2D converter 22 for regulating the output voltage $V_o$.

$$I_{LLC} = I_{Buck} \quad (1)$$

$$P_{LLC} = \left(\frac{V_{LLC}}{V_{in}}\right) P_o \quad (2)$$

$$P_{Buck} = \left(\frac{V_{Buck}}{V_{in}}\right) P_o$$

$$V_{LLC} = \frac{2nV_o}{G_{LLC}} \quad (3)$$

$$V_{Buck} = V_{in} - \frac{2nV_o}{G_{LLC}}$$

Constraint #1

$$n_{max} \leq \left(\frac{V_{inmin}}{V_{omax}} - D_{max}\right) G_{LLC\_max} \quad (4)$$

Constraint #2

$$n_{min} \geq \left(\frac{V_{inmax} - V_{Buckmax}}{V_{omin}}\right) G_{LLC\_min} \quad (5)$$

In one model, the quasi-parallel power converter 10 has two design constraints shown in Equations (4) and (5) above. Both design constraints depend on the turns ratio (n) and gains $G_{LLC\_max}$, $G_{LLC\_min}$ of the DCX converter 20, as given by Equations (4) and (5), where $V_{inmin}$, $V_{inmax}$ are the minimum and maximum input voltages of the power converter 10, $V_{omin}$, $V_{omax}$ are the minimum and maximum output voltages of the power converter 10, $V_{Buckmax}$ is the maximum buck converter input voltage and $D_{max}$ is the maximum buck converter duty ratio.

The first constraint is to limit the buck converter duty ratio D<1, and the second constraint is to limit $V_{Buckmax}$ to a range where the bulk of the power flows through the DCX converter 20. If the DCX converter 20 operates with a switching frequency ($f_s$) equal to the resonant frequency ($f_o$) with unity gain, the turns ratio (n) is the only design parameter. In that case, application of the two constraints to the operating ranges listed in Table 1 will result in the unbounded turns ratios listed in Table 2.

TABLE 1

48 V VRM Operating Voltage Requirements

| $V_{inmin}$ | $V_{inmax}$ | $V_{omin}$ | $V_{omax}$ | $I_{omax}$ |
|---|---|---|---|---|
| 40 V | 59.5 V | 1.3 V | 1.85 V | 225 A |

TABLE 2

DCX Turns Ratio Design Range

| $V_{Buckmax}$ | $D_{max}$ | $n_{max} \leq$ | $n_{min} \leq$ |
|---|---|---|---|
| 24 V | 0.9 | 22 | 28 |

In prior designs of the quasi-parallel power converter 10, the DCX converter 20 operated as an unregulated converter, and the regulation of the output voltage $V_o$ was realized by the D2D converter 22. According to the embodiments described herein, the gain of the DCX converter 20 can be varied over time. In one case, the gain is varied through changing the operating frequency of the DCX converter 20 away from the resonant frequency of the DCX converter 20, through which higher and lower gains $G_{LLC\_max}>1$, $G_{LLC\_min}<1$ are realized.

As described herein, this regulation of the operating frequency of the DCX converter 20 is not particularly relied upon for regulation of the output voltage $V_o$ of the quasi-parallel power converter 10. According to one aspect of the embodiments, the regulation of the operating frequency of the DCX converter 20 is relied upon to regulate the input voltage of the DCX converter 20 (and, hence, the input voltage of the D2D converter 22), in order to realize certain design constraints. For example, the design constraints can include a duty cycle D of the D2D converter 22 where D is always less than 1. In this condition, the input voltage to the D2D converter 22 is at a relative maximum voltage and, as a result, the share of the power converted by the D2D converter 22 is limited to a range such that that the overall efficiency of the quasi-parallel power converter 10 is higher.

Figure 3:
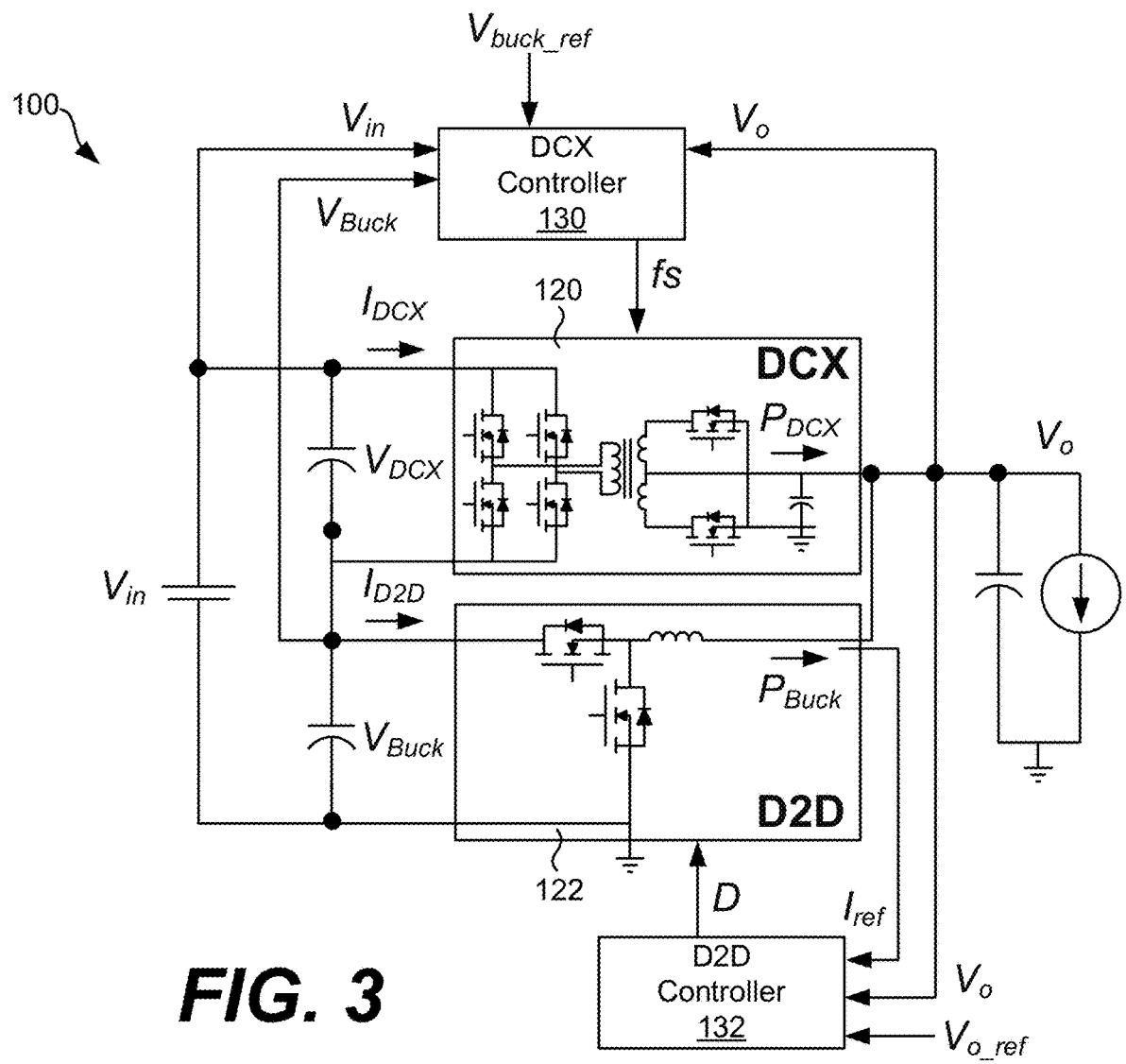
FIG. 3 illustrates a quasi-parallel power converter with controls for efficiency over a wide voltage range according to various examples described herein.

FIG. 3 illustrates a quasi-parallel power converter or system 100 with controls for efficiency over a wide voltage range according to various examples described herein. The quasi-parallel power converter 100 is one example of a power converter that can incorporate the controls described herein to achieve greater efficiency over a wide voltage range. The control techniques described herein can be applied to other topologies of power converters, including other types and variations of quasi-parallel power converters. Among other components, the quasi-parallel power converter 100 includes an input power supply $V_{in}$, an output $V_o$, a first DCX converter 120 coupled to a first supply potential $V_{DCX}$, a DCX controller 130 for the DCX converter 120, a second D2D converter 122 coupled to a second supply potential $V_{Buck}$, and a D2D controller 132 for the D2D converter 122. An input of the DCX converter 120 and an input of the D2D converter 122 are connected in series across the input voltage $V_{in}$ for the power converter system. An output of the DCX converter 120 and an output of the D2D converter 122 are connected in parallel at the output $V_o$ of the quasi-parallel power converter 100.

The DCX converter 120 can be embodied as an isolated DC/DC converter, and the DCX converter 120 can operate in unregulated or semi-regulated conditions as described below. The DCX converter 120 can be embodied as any suitable type or topology of isolated resonant LLC converter. As one example, the DCX converter 120 can be embodied as a full-bridge LLC converter with a full-bridge rectifier. In another example, the DCX converter 120 can be embodied as a half-bridge LLC converter with a half-bridge rectifier. The DCX converter 120 can be embodied as a series resonant converter, a parallel resonant converter, or a series-parallel resonant converter.

The D2D converter 122 can be embodied as any suitable type or topology of non-isolated, regulated power converter. In one example, the D2D converter 122 can be embodied as a buck converter. In other examples, the D2D converter 122 can embodied as a suitable boost converter, a buck-boost converter, a cuk converter, or another suitable topology of power converter. In general, the DCX converter 120 provides bulk power to maintain the output $V_o$, and the D2D converter 122 regulates finer transient voltages at the output $V_o$.

The DCX controller 130 can be embodied as processing circuitry, including memory, configured to control the operations of the DCX converter 120. The DCX controller 130 can be embodied as any suitable type of controller, such as a proportional integral derivative (PID) controller, a proportional integral (PI) controller, or a multi-pole multi-zero controller, among others, to control the operations of the DCX converter 120. As shown in FIG. 3, the DCX controller 130 receives the input voltage $V_{in}$, the output voltage $V_o$, the voltage reference $V_{buck\_ref}$ and the D2D converter 122 input voltage $V_{Buck}$ as inputs. The DCX controller 130 generates and provides the resonant converter operating frequency fs to the DCX converter 120, as an input to the DCX converter 120.

The DCX converter 120 can be generally operated in three operating modes. The operating frequency fs of the DCX converter 120 can be operated at resonant frequency (e.g., fs=fo), below resonant frequency (e.g., f<fo), or above resonant frequency (e.g., f>fo). The DCX controller 130 is configured to determine the operating frequency fs and, thus, the operating mode of the DCX converter 120 based on one or more of $V_{in}$, $V_o$, $V_{buck\_ref}$ and $V_{Buck}$.

The D2D controller 132 can be embodied as processing circuitry, including memory, configured to control the operations of the D2D converter 122. The D2D controller 132 can be embodied as any suitable type of controller, such as a PID controller, a PI controller, or a multi-pole multi-zero controller, among others, to control the operations of the D2D converter 122. As shown in FIG. 3, the D2D controller 132 receives the output voltage $V_o$ and the output reference voltage $V_{o\_ref}$ as inputs. The D2D controller 132 generates and provides the duty cycle D to the D2D converter 122, as an input to the D2D converter 122. The operations of the DCX controller 130 and the D2D controller 132 are described in further detail below. In some cases, the DCX controller 130 and the D2D controller 132 can be realized using a combination of processing circuitry and referenced as a single controller. In other cases, the DCX controller 130 and the D2D controller 132 can be realized using separate processing circuitry and realized as separate controllers.

The D2D controller 132 is configured to operate the D2D converter 122 in a fully regulated mode based on a desired output voltage reference $V_{o\_ref}$. In that context, the D2D controller 132 is configured to sense the output voltage $V_o$, compare it to the reference $V_{o\_ref}$, and determine the duty cycle ratio D for the D2D converter 122 based on the difference between $V_o$ and $V_{o\_ref}$, to regulate the output voltage $V_o$. In this way, the D2D converter 122 regulates finer transients of the output voltage $V_o$.

The DCX controller 130 is configured to operate the DCX converter 120 as a semi-regulated power converter. The DCX converter 120 is semi-regulated because the DCX controller 130 does not always regulate the DCX converter 120. When unregulated, the DCX converter 120 operates at its resonant operating frequency (e.g., fs=fo). The DCX controller 130 is configured to determine whether or not to regulate the DCX converter 120 based on the input voltage $V_{in}$ and the output voltage $V_o$ of the quasi-parallel power converter 100. In some cases, the DCX controller 130 is also configured to determine whether or not to regulate the DCX converter 120 based in part on $V_{Buck}$. The DCX controller 130 is also configured to sense $V_{Buck}$ and compare it to the reference $V_{buck\_ref}$. The DCX controller 130 is also configured change the operating frequency fs of the DCX converter 120 in order to keep the voltage potential $V_{Buck}$ to a desired value or to within a desired range, to improve the overall efficiency of the power converter 100, particularly for certain input and output operating voltage ranges.

The DCX controller 130 can regulate the DCX converter 120 when necessary, by altering or controlling the operating frequency fs of the DCX converter 120. The DCX controller 130 can regulate fs of the DCX converter 120, to improve the efficiency of the quasi-parallel power converter 100, based on the input voltage $V_{in}$ and the output voltage $V_o$ of the quasi-parallel power converter 100. The DCX controller 130 can also regulate fs of the DCX converter 120, to improve the efficiency of the quasi-parallel power converter 100, based in part on $V_{Buck}$. For example, the DCX controller 130 can regulate fs to be greater than a fo for higher input voltage(s) $V_{in}$ and lower output voltage(s) $V_o$ of the quasi-parallel power converter 100, in certain modes or regions of operation. The DCX controller 130 also can regulate fs to be less than a fo for lower input voltage(s) $V_{in}$ and higher output voltage(s) $V_o$ of the quasi-parallel power converter 100, in certain modes or regions of operation. An example of this operation is discussed in greater detail below with reference to FIG. 4.

By controlling the operating frequency fs of the DCX converter 120, the DCX controller 130 can transform a gain of the DCX converter 120. In that context, the DCX controller 130 is configured to reduce the gain of the DCX converter 120 for higher input voltage(s) $V_{in}$ and lower output voltage(s) $V_o$ of the quasi-parallel power converter 100. The DCX controller 130 is also configured to increase the gain of the DCX converter 120 for a lower input voltage $V_{in}$ and a higher output voltage $V_o$ of the quasi-parallel power converter 100. In this context, the higher and lower input and output voltages are related to the overall design of the power converter 100. With these improvements, the power converter 100 can operate more efficiently over a wider range of input and output voltages as compared to other voltage regulators, power converters, and VRMs. An example of this operation is discussed in greater detail below with reference to FIG. 4.

By controlling the operating frequency fs of the DCX converter 120, the DCX controller 130 can effectively control or regulate $V_{DCX}$. The regulation of $V_{DCX}$, in turn, alters or regulates $V_{Buck}$, to alter a ratio of the total power delivered at the output $V_o$ between the DCX converter 120 and the D2D converter 122. The DCX controller 130 can sense the output voltage $V_o$ and the input voltage $V_{in}$ and, based on their values, determines whether to regulate $V_{DCX}$ as compared to $V_{Buck}$ in this way.

Figure 4:
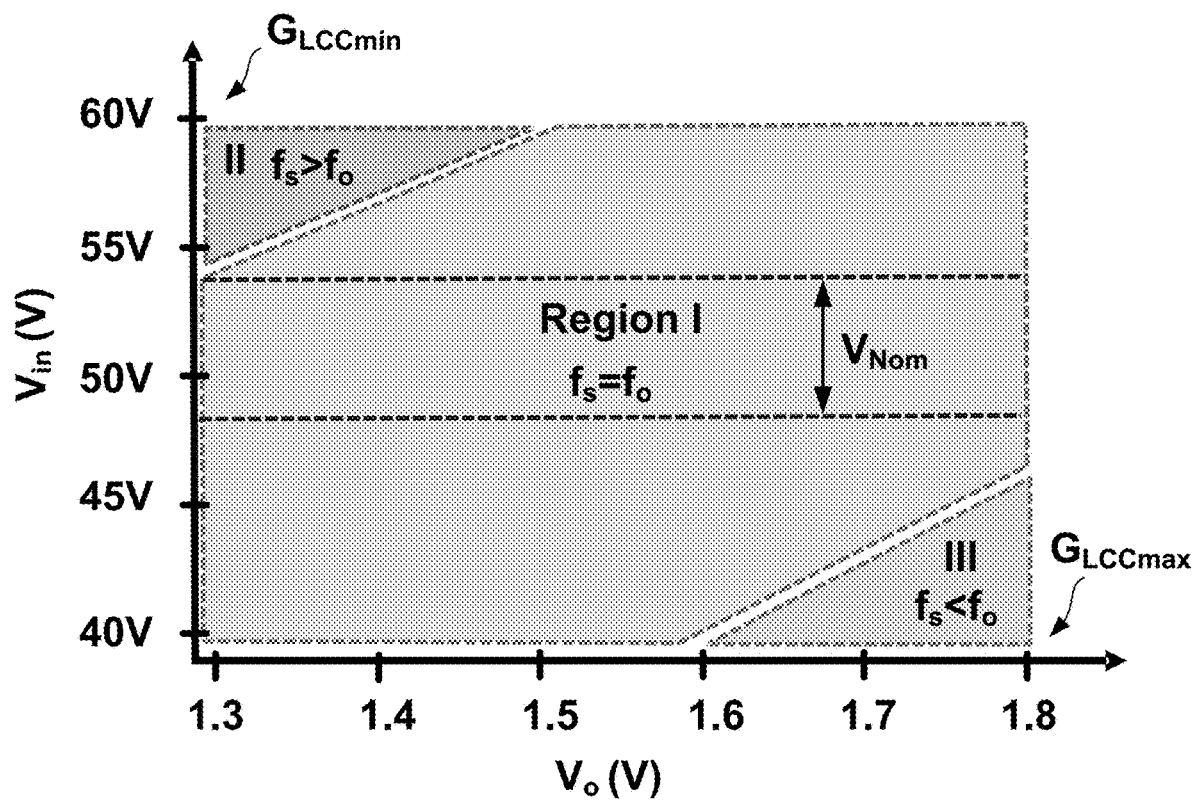
FIG. 4 illustrates operating ranges for the proposed control method of the quasi-parallel power converter shown in FIG. 3 according to various examples described herein.

As one example, choosing the turns ratio of the transformer in the DCX converter 120 at n=12 can result in the quasi-parallel power converter 100 operating over the ranges shown in FIG. 4. In FIG. 4, region I represents the nominal input voltage range. In region I, the DCX converter 120 operates as an unregulated converter at (or about at) the resonant frequency (e.g., fs=fo), with near unity gain ($G_{LCC}=1$). Region I is associated with the highest efficiency operation. In prior quasi-parallel power converters, the DC/DC resonant power converters have operated only at the resonant frequency, limiting the efficiency of the quasi-parallel power converters to a relatively narrow operating range of voltages.

In region II, with high $V_{in}$ and low $V_o$, the DCX converter 120 operates above the resonant frequency ($f_s>f_o$) to reduce its gain (G<1). In this case, according to Equation (3), the value of $V_{DCX}$ will increase, reducing the value of $V_{Buck}$ to within the limits identified in Table 2 for the D2D converter 122, as one example. In region III, with low $V_{in}$ and high $V_o$, the DCX converter 120 operates below the resonant frequency ($f_s<f_o$) to increase its gain (G>1). In this case, according to Equation (3), the value of $V_{DCX}$ will decrease, increasing the value of $V_{Buck}$ and keeping D>1 for the D2D converter 122.

With these operations, the quasi-parallel power converter 100 shown in FIG. 3 can operate across a wider voltage range and with better efficiency during nominal conditions, with gain control of the DCX converter 120 being relied upon at relatively high input/low output and at relatively low input/high output conditions. With this semi-regulation concept, the maximum input voltage of $V_{Buck}$ for the D2D converter 122 can be limited to a certain voltage or voltage range, allowing the use of low voltage MOSFET devices to realize higher efficiency. Limiting the value of $V_{Buck}$ also limits the maximum power share of the D2D converter 122. For example, the maximum power share of the D2D converter 122 can be set to no greater than 40%, by which higher efficiency can be expected.

Figure 5:
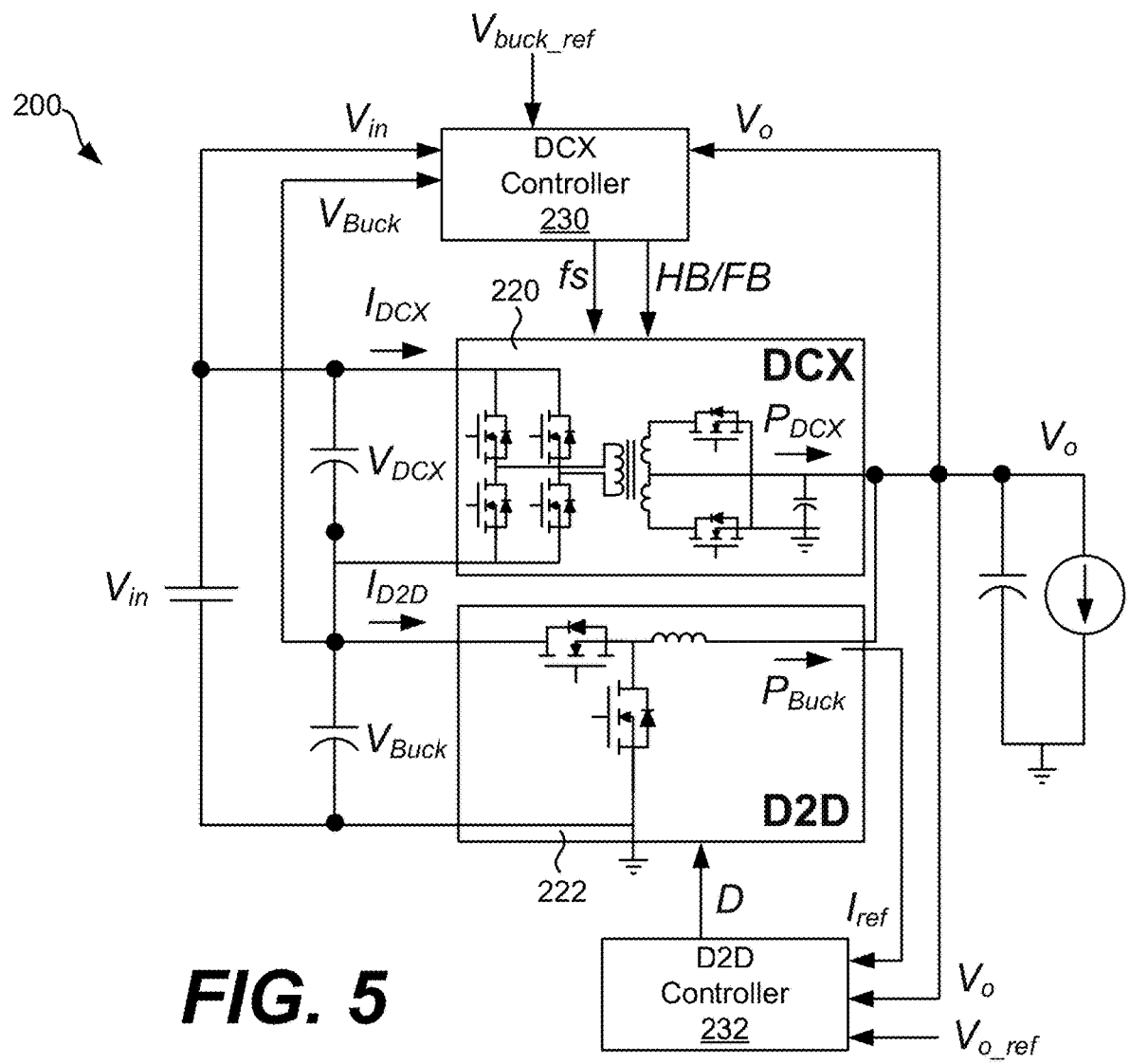
FIG. 5 illustrates a quasi-parallel power converter with alternative controls for efficiency over a wide voltage range according to various examples described herein.

In another embodiment, FIG. 5 illustrates a quasi-parallel power converter 200 with alternative controls for efficiency over a wide voltage range according to various examples described herein. The quasi-parallel power converter 200 is one example of a power converter that can incorporate the controls described herein to achieve greater efficiency over a wide voltage range. The control techniques described herein can be applied to other topologies of power converters, including other types and variations of quasi-parallel power converters. Among other components, the quasi-parallel power converter 200 includes an input power supply $V_{in}$, an output $V_o$, a first DCX converter 220 coupled to a first supply potential $V_{DCX}$, a DCX controller 230 for the DCX converter 220, a second D2D converter 222 coupled to a second supply potential $V_{Buck}$, and a D2D controller 232 for the D2D converter 222. An input of the DCX converter 220 and an input of the D2D converter 222 are connected in series across the input voltage $V_{in}$ for the power converter system. An output of the DCX converter 220 and an output of the D2D converter 222 are connected in parallel at the output $V_o$ of the quasi-parallel power converter 200.

The DCX converter 220 can be embodied as an isolated DC/DC converter, and the DCX converter 220 can operate in unregulated or semi-regulated conditions as described below. The DCX converter 120 can be embodied as a series resonant converter, a parallel resonant converter, or a series-parallel resonant converter. As described below, the DCX controller 230 can transform a gain of the DCX converter 220 by altering a primary side configuration of the DCX converter 220 between full-bridge and half-bridge configurations.

The D2D converter 122 can be embodied as any suitable type or topology of non-isolated, regulated power converter. In one example, the D2D converter 122 can be embodied as a buck converter. In other examples, the D2D converter 122 can embodied as a suitable boost converter, a buck-boost converter, a cuk converter, or another suitable topology of power converter. In general, the DCX converter 120 provides bulk power to maintain the output $V_o$, and the D2D converter 122 regulates finer transient voltages at the output $V_o$.

The DCX controller 130 can be embodied as processing circuitry, including memory, configured to control the operations of the DCX converter 120. The DCX controller 130 can be embodied as any suitable type of controller, such as a proportional integral derivative (PID) controller, a proportional integral (PI) controller, or a multi-pole multi-zero controller, among others, to control the operations of the DCX converter 120. As shown in FIG. 3, the DCX controller 130 receives the input voltage $V_{in}$, the output voltage $V_o$, the voltage reference $V_{buck\_ref}$, and the D2D converter 122 input voltage $V_{Buck}$ as inputs. The DCX controller 130 generates and provides the resonant converter operating frequency fs to the DCX converter 120, as an input to the DCX converter 120. The DCX controller 130 also generates a configuration control signal, designated as "HB/FB" in FIG. 5, to control the primary side configuration of the DCX converter 220 between full-bridge and half-bridge configurations.

The DCX converter 220 can be generally operated in three operating modes. The operating frequency fs of the DCX converter 220 can be operated at resonant frequency (e.g., fs=fo), below resonant frequency (e.g., f<fo), or above resonant frequency (e.g., fs>fo). The DCX controller 230 is configured to determine the operating frequency fs and, thus, the operating mode of the DCX converter 220 based on one or more of $V_{in}$, $V_o$, $V_{buck\_ref}$, and $V_{Buck}$.

The D2D controller 232 can be embodied as processing circuitry, including memory, configured to control the operations of the D2D converter 222. The D2D controller 232 can be embodied as any suitable type of controller, such as a PID controller, a PI controller, or a multi-pole multi-zero controller, among others, to control the operations of the D2D converter 222. As shown in FIG. 5, the D2D controller 232 receives the output voltage $V_o$ and the output reference voltage $V_{o\_ref}$ as inputs. The D2D controller 232 generates and provides the duty cycle D to the D2D converter 222, as an input to the D2D converter 222. The operations of the DCX controller 230 and the D2D controller 232 are described in further detail below. In some cases, the DCX controller 230 and the D2D controller 232 can be realized using a combination of processing circuitry and referenced as a single controller. In other cases, the DCX controller 230 and the D2D controller 232 can be realized using separate processing circuitry and realized as separate controllers.

The D2D controller 232 is configured to operate the D2D converter 222 in a fully regulated mode based on a desired output voltage reference $V_{o\_ref}$. In that context, the D2D controller 232 is configured to sense the output voltage $V_o$, compare it to the reference $V_{o\_ref}$, and determine the duty cycle ratio D for the D2D converter 222 based on the difference between V and $V_{o\_ref}$, to regulate the output voltage $V_o$. In this way, the D2D converter 222 regulates finer transients of the output voltage $V_o$.

The DCX controller 230 is configured to operate the DCX converter 220 as a semi-regulated power converter. The DCX converter 220 is semi-regulated because the DCX controller 230 does not always regulate the DCX converter 220. When unregulated, the DCX converter 220 operates at its resonant operating frequency (e.g., fs=fo). The DCX controller 230 is configured to determine whether or not to regulate the DCX converter 220 based on the input voltage $V_{in}$ and the output voltage $V_o$ of the quasi-parallel power converter 200, among other possible factors.

The DCX controller 230 is configured to control the DCX converter 220 in two primary ways or steps. First, the DCX controller 230 can determine the primary side configuration of the DCX converter 220 to be a full-bridge or a half-bridge configuration. Switching from full-bridge to half-bridge gives the DCX converter 220 an instantaneous gain change (M) by factor of 2 as shown below in Equation (6) below. This is considered a first step of regulation, with the second step of regulation still being realized by frequency control of the DCX converter 220.

$$M_{FullBridge} = \frac{nV_o}{V_{in}} \quad (6)$$

$$M_{HalfBridge} = \frac{2nV_o}{V_{in}}$$

As a second step of regulation, the DCX controller 230 can also change the operating frequency fs of the DCX converter 120 in order to keep the voltage potential $V_{Buck}$ to a desired value or to within a desired range, to improve the overall efficiency of the quasi-parallel power converter 200, particularly for certain input and output operating voltage ranges. In this second step of regulation, the DCX controller 230 can regulate the DCX converter 220 when necessary, by altering or controlling the operating frequency fs of the DCX converter 220. The DCX controller 230 can regulate fs of the DCX converter 220, to improve the efficiency of the quasi-parallel power converter 200, based on the input voltage $V_{in}$ and the output voltage $V_o$ of the quasi-parallel power converter 200. The DCX controller 230 can also regulate fs of the DCX converter 220, to improve the efficiency of the quasi-parallel power converter 200, based in part on $V_{Buck}$. For example, the DCX controller 230 can regulate fs to be greater than a fo for higher input voltage(s) $V_{in}$ and lower output voltage(s) $V_o$ of the quasi-parallel power converter 100, in certain modes or regions of operation. The DCX controller 230 also can regulate fs to be less than a fo for lower input voltage(s) $V_{in}$ and a higher output voltage(s) $V_o$ of the quasi-parallel power converter 100, in certain modes or regions of operation. An example of these two steps of regulation is discussed in greater detail below with reference to FIG. 6.

By controlling the operating frequency fs of the DCX converter 220, the DCX controller 230 can further transform the gain of the DCX converter 220. The DCX controller 230 is configured to reduce the gain of the DCX converter 220 for higher input voltage(s) $V_{in}$ and lower output voltage(s) $V_o$ of the quasi-parallel power converter 200. The DCX controller 230 is also configured to increase the gain of the DCX converter 220 for lower input voltage(s) $V_{in}$ and higher output voltage(s) $V_o$ of the quasi-parallel power converter 200. An example of this operation is discussed in greater detail below with reference to FIG. 6.

By controlling the operating frequency fs of the DCX converter 220, the DCX controller 230 can effectively control or regulate $V_{DCX}$. The regulation of $V_{DCX}$, in turn, alters or regulates $V_{Buck}$, to alter a ratio of the total power delivered at the output $V_o$ between the DCX converter 220 and the D2D converter 222. The DCX controller 230 can sense the output voltage $V_o$ and the input voltage $V_{in}$ and, based on their values, determines whether to regulate $V_{DCX}$ as compared to $V_{Buck}$ in this way.

Figure 6:
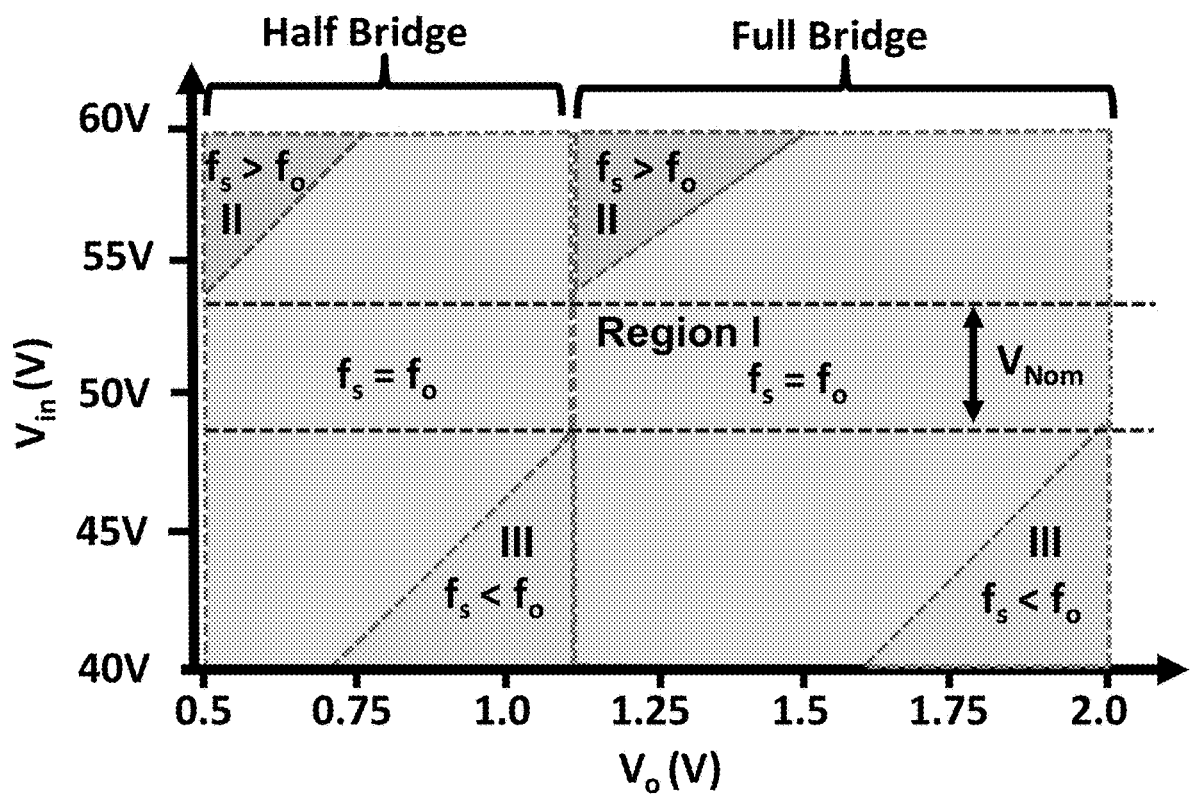
FIG. 6 illustrates operating ranges for the proposed control method of the quasi-parallel power converter shown in FIG. 5 according to various examples described herein.

By utilizing these two steps of regulation, wider operating ranges of input and output voltages can be relied upon as shown in FIG. 6. In the nominal condition, the DCX converter 220 is operating at its optimal efficiency point at resonant frequency. Changing the gain of the DCX converter 220 by frequency control or changing the primary side configuration of the DCX converter 220 can maintain the D2D converter 222 limited to minimum voltage and power sharing in the entire range. The gain requirements of the DCX converter 220 is also limited to a range that can be realized by narrow frequency range control.

For both the half-bridge and the full-bridge primary side configurations of the DCX converter 220, region I represents the nominal input voltage range. In region I, the DCX converter 220 operates as an unregulated converter at (or about at) the resonant frequency (e.g., ft=fo), with near unity gain ($G_{LCC}$=1). Region I is associated with the highest efficiency operation for both the half-bridge and the full-bridge primary side configurations. In prior quasi-parallel power converters, the DC/DC resonant power converters have operated only at the resonant frequency, limiting the efficiency of the quasi-parallel power converters to a relatively narrow operating range of voltages.

In region II, at relatively high $V_{in}$ and low $V_o$ for both the half-bridge and the full-bridge configurations, the DCX converter 220 operates above the resonant frequency ($f_s>f_o$) to reduce gain. In this case, the value of $V_{DCX}$ will increase, reducing the value of $V_{Buck}$. In region III, with low $V_{in}$ and high $V_o$ for both the half-bridge and the full-bridge configurations, the DCX converter 220 operates below the resonant frequency ($f_s<f_o$) to increase gain.

With two step operations, the quasi-parallel converter 200 shown in FIG. 5 can operate across a wider voltage range and with better efficiency during nominal conditions, with frequency-based gain control of the DCX converter 220 being relied upon at relatively high input/low output and at relatively low input/high output conditions for both the half-bridge and the full-bridge primary side configurations.

Figure 7:
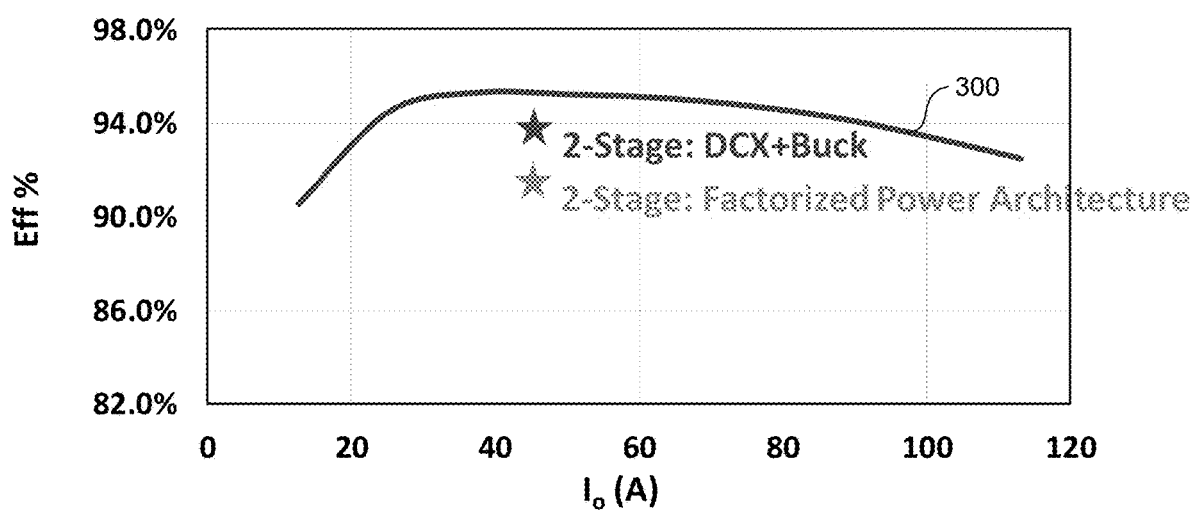
FIG. 7 illustrates the efficiency of the proposed control methods described herein over a range of power as compared to the conventional control methods for a quasi-parallel power converter.

A converter based on the gain control concepts described herein has been realized using an integrated magnetic structure. The converter can operate with an input voltage range of 40-60V and output voltage range of 1.3-1.85V suitable for CPU VRMs, although other power converters capable of operating over other input and output ranges can benefit from the control concepts described herein. The converter measured efficiency 300 is shown in FIG. 7, which shows that the converter can achieve better efficiency than prior art solutions based on two-stage configurations.

In various embodiments, the controllers described herein can be embodied as a collection of discrete, integrated, or a mixture of discrete and integrated analog, digital, or mixed analog and digital hardware circuit components. For example, the DCX controllers 130/230 and the D2D controllers 132/232 can be embodied as a collection of discrete analog, digital, or mixed analog and digital hardware circuit components. The hardware can include one or more discrete logic circuits, microprocessors, microcontrollers, or DSPs, application specific integrated circuits (ASICs), programmable logic devices (e.g., field-programmable gate array (FPGAs), or complex programmable logic devices (CPLDs)), among other types of processing circuitry.

In some cases, the microprocessors, microcontrollers, or DSPs can execute software to perform the control aspects of the embodiments described herein. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter system, comprising:
a first power converter;
a second power converter, an input of the first power converter and an input of the second power converter being connected in series across an input voltage for the power converter system, and an output of the first power converter and an output of the second power converter being connected in parallel at an output of the power converter system; and
a controller configured to regulate the second power converter, and to determine whether or not to regulate an operating frequency of the first power converter to be greater or less than a resonant frequency of the first power converter based on the input voltage for the power converter system and an output voltage of the power converter system, the controller configured to regulate the operating frequency of the first power converter, for efficiency of the power converter system, based on the input voltage for the power converter system and the output voltage of the power converter system, wherein the controller is further configured to:
regulate the operating frequency of the first power converter to be greater than the resonant frequency of the first power converter for a higher input voltage of the power converter system and a lower output voltage of the power converter system; and
regulate the operating frequency of the first power converter to be less than the resonant frequency of the first power converter for a lower input voltage of the power converter system and a higher output voltage of the power converter system.

2. The power converter system according to claim 1, wherein:
the first power converter comprises an isolated semi-regulated resonant power converter; and the second power converter comprises a non-isolated regulated power converter.

3. The power converter system according to claim 1, wherein:
the first power converter comprises a full-bridge or half-bridge resonant power converter; and
the second power converter comprises a buck, boost, or buck-boost power converter.

4. The power converter system according to claim 1, wherein:
the first power converter provides bulk power at the output of the power converter system; and
the second power converter regulates the output voltage at the output of the power converter system.

5. The power converter system according to claim 1, wherein the controller is further configured to regulate the operating frequency of the first power converter to transform a gain of the first power converter.

6. The power converter system according to claim 1, wherein:
the first power converter comprises a transformer; and
the controller is further configured to transform a gain of the first power converter by altering a primary side configuration supplying a primary side of the transformer.

7. The power converter system according to claim 1, wherein the output of the first power converter and the output of the second power converter are connected in parallel at the output of the power converter system to share a total power delivered at the output of the power converter system.

8. A power converter system, comprising:
a first power converter;
a second power converter, an input of the first power converter and an input of the second power converter being connected in series across an input voltage for the power converter system, and an output of the first power converter and an output of the second power converter being connected in parallel at an output of the power converter system; and
a controller configured to regulate the second power converter, and to determine whether or not to regulate an operating frequency of the first power converter to be greater or less than a resonant frequency of the first power converter based on the input voltage for the power converter system and an output voltage of the power converter system, the controller configured to regulate the operating frequency of the first power converter to transform a gain of the first power converter, wherein the controller is further configured to:
reduce the gain of the first power converter for a higher input voltage of the power converter system and a lower output voltage of the power converter system; and
increase the gain of the first power converter for a lower input voltage of the power converter system and a higher output voltage of the power converter system.

9. The power converter system according to claim 8, wherein
the controller is further configured to regulate the operating frequency of the first power converter, for efficiency of the power converter system, based on the input voltage for the power converter system and the output voltage of the power converter system.

10. The power converter system according to claim 8, wherein the controller is further configured to regulate an input voltage at the input of the first power converter as compared to an input voltage at the input of the second power converter, to maintain the input voltage at the input of the second power converter to within a certain voltage range.

11. The power converter system according to claim 8, wherein the output of the first power converter and the output of the second power converter are connected in parallel at the output of the power converter system to share a total power delivered at the output of the power converter system.

12. The power converter system according to claim 11, wherein the controller is further configured to regulate an input voltage at the input of the first power converter as compared to an input voltage at the input of the second power converter, to alter a ratio of the total power delivered at the output of the power converter system between the first power converter and the second power converter.

13. The power converter system according to claim 8, wherein:
the first power converter comprises a transformer; and
the controller is further configured to transform the gain of the first power converter by altering a primary side configuration supplying a primary side of the transformer between full-bridge and half-bridge configurations.

14. The power converter system according to claim 8, wherein:
the first power converter comprises an isolated semi-regulated resonant power converter; and
the second power converter comprises a non-isolated regulated power converter.

15. A power converter system, comprising:
a first power converter, the first power converter comprising a resonant power converter;
a second power converter, an input of the first power converter and an input of the second power converter being connected in series across an input voltage for the power converter system, and an output of the first power converter and an output of the second power converter being connected in parallel at an output of the power converter system; and
a controller configured to determine whether or not to regulate an operating frequency of the first power converter based on the input voltage for the power converter system and an output voltage of the power converter system, wherein the controller is further configured to:
reduce a gain of the first power converter for a higher input voltage of the power converter system and a lower output voltage of the power converter system; and
increase the gain of the first power converter for a lower input voltage of the power converter system and a higher output voltage of the power converter system.

16. The power converter system according to claim 15, wherein:
the first power converter provides bulk power at the output of the power converter system; and
the second power converter regulates the output voltage at the output of the power converter system.

17. The power converter system according to claim 15, wherein the controller is further configured to regulate the operating frequency of the first power converter, for efficiency of the power converter system, based on the input voltage for the power converter system and the output voltage of the power converter system.

18. The power converter system according to claim 15, wherein the controller is further configured to regulate an input voltage at the input of the first power converter as compared to an input voltage at the input of the second power converter, to maintain the input voltage at the input of the second power converter to within a certain voltage range.

19. The power converter system according to claim 15, wherein the controller is further configured to regulate an input voltage at the input of the first power converter as compared to an input voltage at the input of the second power converter, to alter a ratio of total power delivered at the output of the power converter system between the first power converter and the second power converter.

20. The power converter system according to claim 15, wherein:
   the first power converter comprises a transformer; and
   the controller is further configured to transform a gain of the first power converter by altering a primary side configuration supplying a primary side of the transformer between full-bridge and half-bridge configurations.

* * * * *